United States Patent [19]

Jamison

[11] Patent Number: 4,811,818
[45] Date of Patent: Mar. 14, 1989

[54] TRANSIT RAIL LUBRICANT APPLICATOR

[75] Inventor: Warren E. Jamison, Edmonds, Wash.

[73] Assignee: Durafilm Corporation, Seattle, Wash.

[21] Appl. No.: 86,912

[22] Filed: Aug. 19, 1987

[51] Int. Cl.$^4$ .............................................. F16N 15/00
[52] U.S. Cl. .................................. 184/3.2; 105/463.1; 118/207; 427/11
[58] Field of Search ................... 184/3.1, 3.2, 99, 101, 184/102; 105/463.1; 118/207, 264; 427/11

[56] References Cited

U.S. PATENT DOCUMENTS

| | | | |
|---|---|---|---|
| 1,222,341 | 4/1917 | Wholey | 184/3.2 |
| 2,589,582 | 3/1952 | Strughold et al. | 184/3.2 X |
| 2,727,589 | 12/1955 | Campney | 184/3.2 |
| 3,783,971 | 1/1974 | Miyake | 184/3.2 |

OTHER PUBLICATIONS

"Moly Sticks Dry Flange Lubricant", Nalco Chemical Company, 6216 W. 66th Place, Chicago, Illinois 60638, Bulletin 66-2, 5 pages.
"Nalco Moly Stick", Nalco Chemical Company, 6216 W. 66th Place, Chicago 38, Illinois, Bulletin 591, 1 page.
5 Information sheets, National Brand Graphite Wheel Flange Lubricating Rods, National Carbon Company, 30 East 42nd Street, NY 17, NY.
Instructions publication GEI-81902A, General Electric Flange Lubricator, two pages, General Electric, Transportation Systems Business Division, Erie, Pennsylvania 16531.

*Primary Examiner*—Carlton R. Croyle
*Assistant Examiner*—Leonard P. Walnoha
*Attorney, Agent, or Firm*—Christensen, O'Connor, Johnson & Kindness

[57] ABSTRACT

An applicator for mounting a block of solid lubricant to deposit a thin film of lubricant on the flange of a transit rail car wheel. The applicator (10) includes a bracket (12) adapted to mount the applicator to an unsprung portion of a transit rail car. A pivot arm (26) is pivotally connected at one end of bracket (12) and a block of solid lubricant (42) attached to a mounting plate (34) is bolted to the other end of the pivot arm. The block of solid lubricant is biased against the flange (40) of a transit car wheel by a torsion spring (28). A stop (32) prevents the pivot arm from contacting the wheel as the lubricant block wears by deposition of a thin film of lubricant on the rail car wheel flange as the wheel rolls.

15 Claims, 2 Drawing Sheets

TRANSIT RAIL LUBRICANT APPLICATOR

TECHNICAL FIELD

This invention generally pertains to a lubricant applicator, and more specifically, to an applicator used for applying a solid lubricant to a rail car wheel.

BACKGROUND OF THE INVENTION

The railroad industry has tried for years to develop a satisfactory mechanism for lubricating the flange of railroad car wheels to reduce both rail and wheel wear that occurs as the flange rubs on the sides of the rails. The friction between wheel flanges and the rails is readily apparent from the squealing sound produced as a train rounds a curve; however, wear also occurs on straightaway sections of the track as the cars shift from side to side, bringing the rims of the wheels into contact with the sides of the rail.

Prior attempts to develop a mechanism to lubricate the wheels and rail have generally been unsuccessful because of the difficulty of applying a properly metered quantity of oil or grease to the wheel rim, while avoiding lubricant flow onto the portion of the wheel that runs on the top crown of the rail. When lubricant applied to the rim inadvertently runs onto the tread portion of the wheel, it tends to coat the rail crown, reducing the driving friction of the locomotive wheels, and impairing the ability of the railcar brakes to stop the train within a safe distance.

Most prior art lubricant applicators have included some form of pump and metering mechanism to supply oil or grease to the rim of the wheel in a metered flow. An example of such an applicator is disclosed in U.S. Pat. No. 3,783,971, wherein an applicator wheel is rotatably driven by the rail wheel, and is connected to drive an axially reciprocating piston. As the piston reciprocates within a chamber, it pumps oil from a supply through a restriction passage and onto a felt wick that is disposed in a groove around the circumference of the applicator wheel. The oil is thus applied by the felt wick to the railcar wheel as the car rolls down the track. A slotted link and pawl arrangement drives the piston to pump oil, regardless of the rotational direction of the applicator wheel.

Even if successful in properly metering oil or grease onto the rim of a wheel, such an applicator cannot prevent the oil from flowing onto adjacent surfaces of the wheel and eventually finding its way to the crown of the rail where it is likely to cause unacceptable slippage. Furthermore, if applied at too heavy a flow rate, the lubricant is likely to be flung from the wheel onto the undersurface of the railcar, and into the track-side environment, thereby creating a pollution problem.

In attempting to avoid the above problems, solid lubricant sticks have been developed in the prior art for use in applying a lubricating film to the flanges of rail car wheels. One of the commerically available lubricating sticks includes a ctalytically cured molybdenum disulfide compound molded in a cylindrical foil wrapper. The lubricating stick is mounted in a tubular applicator and is biased against the flange of a rail car wheel by a weight.

A similar stick or rod-type lubricant comprises a graphite base lubricating composition core enclosed in a molded "electric furnace" graphite shell. The graphite stick is placed in a tubular applicator and is biased against the wheel flange with a helical coil spring.

The dry lubricant sticks described above overcome some of the problems associated with lubricating rail car wheels using conventional oil or grease; however, they fail to provide a complete solution to the problem. Both types of dry lubricant sticks are fragile, being made of hard, brittle materials, which tend to break easily. Accordingly, a solid lubricant composition has been developed which is useful for lubricating rail car wheels, and is disclosed in the commonly assigned U.S. patent application, Ser. No. 72,097, filed July 10, 1987. The solid lubricant described in this patent application can be molded into rectangular blocks of various dimension that are ideally suited for applying a thin film of lubricant to the flanges of wheels on rail transit cars. Such cars receive weekly maintenance during which any worn blocks of solid lubricant composition might easily be replaced. None of the prior art solid lubricant applicators involving tubes useful for applying graphite rods are adapted for applying a rectangular block of the solid lubricant composition. The present invention provides a relatively low cost applicable for use with the solid lubricant blocks that is easily mounted on almost any style of transit rail car.

SUMMARY OF THE INVENTION

In accordance with the present invention, a lubricant applicator is provided that includes a fixed bracket adapted to attach to an undercarriage of a rail car, on an unsprung portion, proximate a rail car wheel that is to be lubricated. A lubricant support arm is pivotally connected to the fixed bracket and is adapted to mount a block of solid lubricant at a point spaced apart from that at which the arm is pivotally connected to the bracket. Spring means are operative to bias the lubricant support arm so that the solid lubricant block mounted thereon is brought into contact with a flange of the rail car wheel. The spring means comprise a torsion spring disposed about the pivotal connection between the arm and the fixed bracket.

A stop serves to limit the rotation of the lubricant arm preventing it contacting the rail car wheel as the block of solid lubricant wears by deposition of a thin film of lubricant onto the wheel flange. The solid lubricant block is mounted to a plate, which is in turn connected to the lubricant support arm.

DISCLOSURE OF THE PREFERRED EMBODIMENT

Figure 1:
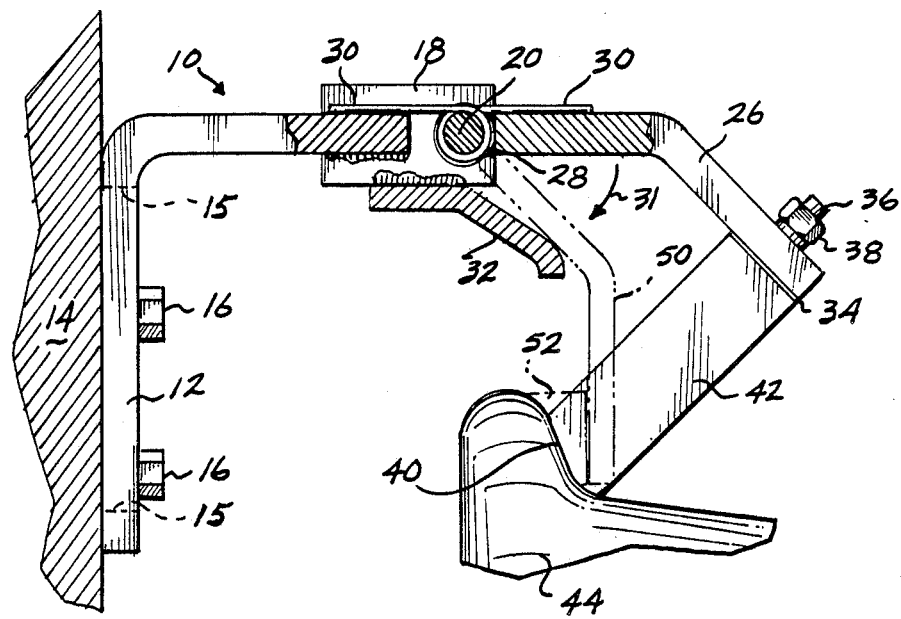
FIG. 1 is a side elevational view showing the solid lubricant applicator mounted to an unsprung portion of a rail car, adjacent a rail car wheel, with a portion cut away to expose details of a pivot joint.
Figure 2:
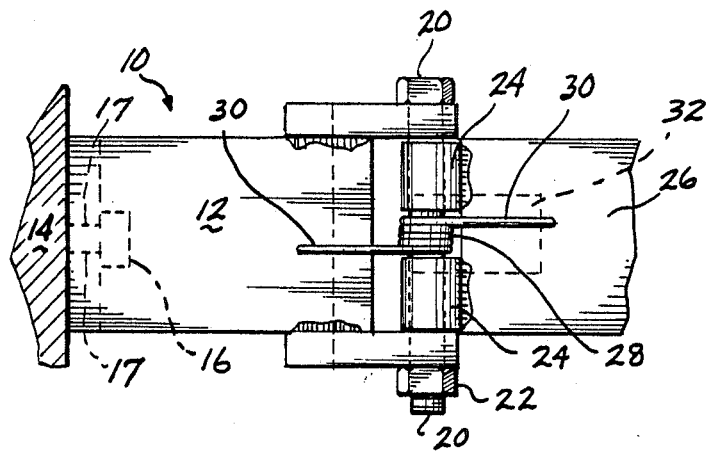
FIG. 2 is a top cutaway plan view of the solid lubricant applicator.

As shown in FIGS. 1 and 2, the solid lubricant applicator is generally represented by reference numeral 10. Applicator 10 includes a bracket 12 formed of flat bar stock bent into an "L"-shape and including either a plurality of holes or, preferably, a slot defined by dashed lines 15 and 17, through which bolts 16 or other appropriate fasteners may be inserted to attach the bracket to an unsprung portion 14 of a transit rail car, proximate to a wheel to be lubricated. It should be apparent that bracket 12 may be bent at an angle other than 90° to accommodate installation of the lubricant applicator 10 on transit rail cars of different design and manufacture. It is relatively important, however, that bracket 12 be mounted to an unsprung portion of the rail car wheel truck assembly so that the applicator 10 moves with the wheel, rather than with the transit rail car, to minimize relative motion between the wheel and applicator.

Rectangular flange plates 18 are welded along each side of bracket 12 extending beyond its end. The extending end of flange plates 18 are drilled to accept a bolt 20, held in place with a nut 22. Bolt 20 may alternatively be replaced with a fixed pin welded between flange plates 18; however, bolt 20 permits lubricant applicator 10 to be disassembled for replacement of parts as necessary. Bolt 20 passes through two tubular sections 24 that are welded to the end of a pivoting arm 26. Tubular sections 24 may also be formed by rolling over the end of pivoting arm 26, as is commonly done in forming the pivot connections of hinges. Bolt 20 passes through tubular sections 24 and through the center of a torsion spring 28 disposed in a slot between tubular sections 24. The end of torsion spring 28 extends across the surface of pivot arm 26 and bracket 12, applying a bias force tending to swing the bracket and arm together, as illustrated by arrow 31 in FIG. 1.

Figure 3:
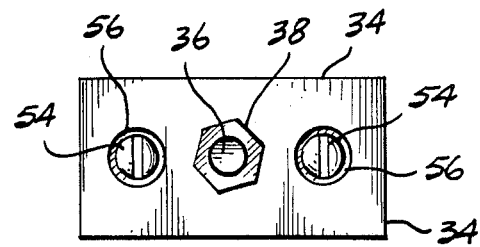
FIG. 3 is a top plan view of a mounting plate used to attach a block of solid lubricant to the applicator.
Figure 4:
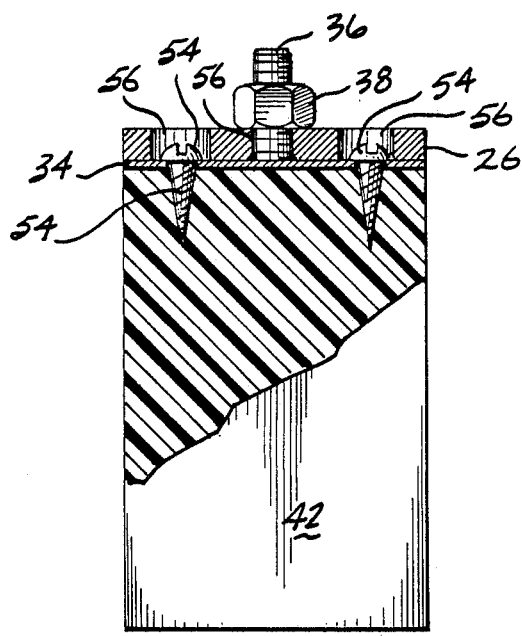
FIG. 4 is a side elevation view of a solid lubricant block mounted on the lubricant applicator, wherein the lubricant block has been partially cut away to illustrate the manner in which it is mounted.

Pivot arm 26 is formed from flat bar stock and is bent at an acute angle as appropriate for geometry of the particular transit rail car on which applicator 10 is mounted. The outwardly extending end of pivot arm 26 is adapted to mount a block 42 of solid lubricant, which is connected to a mounting plate 34. Details of mounting plate 34 and of the manner in which lubricant block 42 is connected thereto are shown in FIGS. 3 and 4. Mounting plate 34 includes a stud 36 welded to the center of one surface and is connected to block 42 of the solid lubricant composition by means of two screws 54. The heads of screws 54 are seated within two holes 56 provided in the extending end of pivot arm 26 and aligned with a centrally disposed hole 56 through which stud 36 extends. A nut 38 retains stud 36 on the end of pivot arm 26, thereby attaching mounting plate 34 and solid lubricant block 42 to the pivot arm. Interference between the heads of screws 54 and the interior of hole 56 prevents the solid lubricant block from rotating about stud 36, locking the lubricant block in a fixed position.

Torsion spring 28 biases pivot arm 26 and attached lubricant block 42 toward the flange 40 of a transit rail car wheel 44. Contact of the solid lubricant block 42 with flange 40 effects deposition of a thin lubricant film on the flange as the wheel rolls, providing lubrication between the flange and the side of a rail (not shown). This lubrication reduces friction between flange 40 and the rail, and wear of both surfaces.

As lubricant block 42 is deposited upon flange 40, the block gradually wears away to a point where replacement is necessary. Referring back to FIG. 1, dashed lines 50 illustrate the deposition of pivot arm 26 when replacement of a worn solid lubricant block 52 is required. Worn lubricant block 52 is easily replaced by loosening nut 38, removing the work block 52, and replacing with a new lubricant block 42.

A pivot stop 32 is welded between flange plates 18, and extends outwardly toward lubricant block 42 at an angle appropriate to intercept the pivotal motion of pivot arm 26, preventing it from contacting flange 40 or any other part of wheel 44. Since screws 54 extend partway into lubricant block 42, it is important that the pivotal motion of pivot arm 26 be limited to prevent screws 54 or arm 26 from contacting any part of wheel 44.

While the preferred embodiment of the present invention has been described above, it should be understood that variations and modifications thereto will be apparent to those skilled in the art. Accordingly, the invention is not to be limited to the specific embodiment illustrated and described, but instead the scope of the invention should be determined by reference to the claims that follow hereinbelow.

The embodiments of the invention in which an exclusive property or privilege is claimed are defined as follows:

1. A lubricant applicator comprising:
   (a) a fixed bracket adapted to attach to an undercarriage of a rail car;
   (b) a lubricant support arm, pivotally connected to the fixed bracket and adapted to mount a block of solid lubricant on a surface of the lubricant support arm at a point spaced apart from the pivotal connection; and
   (c) spring means for biasing the lubricant support arm so that it and the block of solid lubricant mounted thereon swing through an arc, bringing the block of solid lubricant into contact with a rail car wheel flange.

2. The lubricant applicator of claim 1 wherein the spring means comprise a torsion spring disposed about the pivotal connection.

3. The lubricant applicator of claim 1 further comprising a stop limiting the rotation of the arm so that it does not contact the rail car wheel.

4. The lubricant applicator of claim 1 further comprising a lubricant block mounting plate that is disposed intermediate the solid lubricant block and the arm, and which is attached to both the lubricant block and the arm.

5. The lubricant applicator of claim 1 wherein one of the fixed bracket and the arm crosses a plane through the rail car wheel circumference.

6. An applicator for applying a film of a solid lubricant to a rail car wheel flange, comprising
   (a) bracket means for fixedly attaching the applicator to an unsprung portion of the rail car, proximate the wheel to be lubricated;
   (b) an arm pivotally connected to the bracket means and able to swing in an arc substantially perpendicular to a line tangent to the rail car wheel flanges;
   (c) means for mounting a block of the solid lubricant to a surface of the arm so that it extends unconfined from said surface toward the rail car wheel; and
   (d) spring means for biasing the arm and the block of lubricant to swing in an arc toward the rail car wheel flange, bringing the solid lubricant block into contact with the flange, so that a thin film of solid lubricant is deposited thereon.

7. The applicator of claim 6 wherein the bracket means comprise a slotted flat bar formed generally in an "L" shape.

8. The applicator of claim 6 wherein the arm is pivotally connected to the bracket means by a pin, and wherein the spring means comprise a torsion spring surrounding the pin and embracing the bracket means and the arm.

9. The applicator of claim 6 further comprising means for limiting the pivotal movement of the arm, preventing it contacting the rail car wheel.

10. The applicator of claim 6 wherein the means for mounting the block of solid lubricant comprise a plate connected to the block and to the arm.

11. The applicator of claim 6 wherein the arm subtends an acute angle as the block wears against the rail car wheel flange.

12. A method for lubricating a rail car wheel flange, comprising the steps of:
    (a) fixedly attaching a bracket to an unsprung portion of a rail car, proximate the wheel to be lubricated;
    (b) pivotally connecting an arm to the bracket so that it may rotate toward the rail car wheel flange;
    (c) mounting a block of solid lubricant to a surface of the arm so that it is otherwise unconfined;
    (d) biasing the arm and the block of solid lubricant to swing in an arc toward the rail car wheel flange;
    (e) bringing the solid lubricant block into contact with the flange; and
    (f) depositing a thin film of solid lubricant onto the flange as it rubs against the solid lubricant block when the wheel rolls.

13. The method of claim 12 wherein the arm is biased toward the flange by means of a torsion spring.

14. The method of claim 12 further comprising the step of limiting the rotational travel of the arm to prevent it contacting the wheel.

15. The method of claim 12 further comprising the steps of removing and replacing the block of solid lubricant when it is worn.

* * * * *